Aug. 31, 1954
C. W. MAHR
2,687,576
ELECTRICALLY OPERATED TESTING APPARATUS
FOR GEARS AND SIMILAR TOOTHED ELEMENTS
Filed June 17, 1950
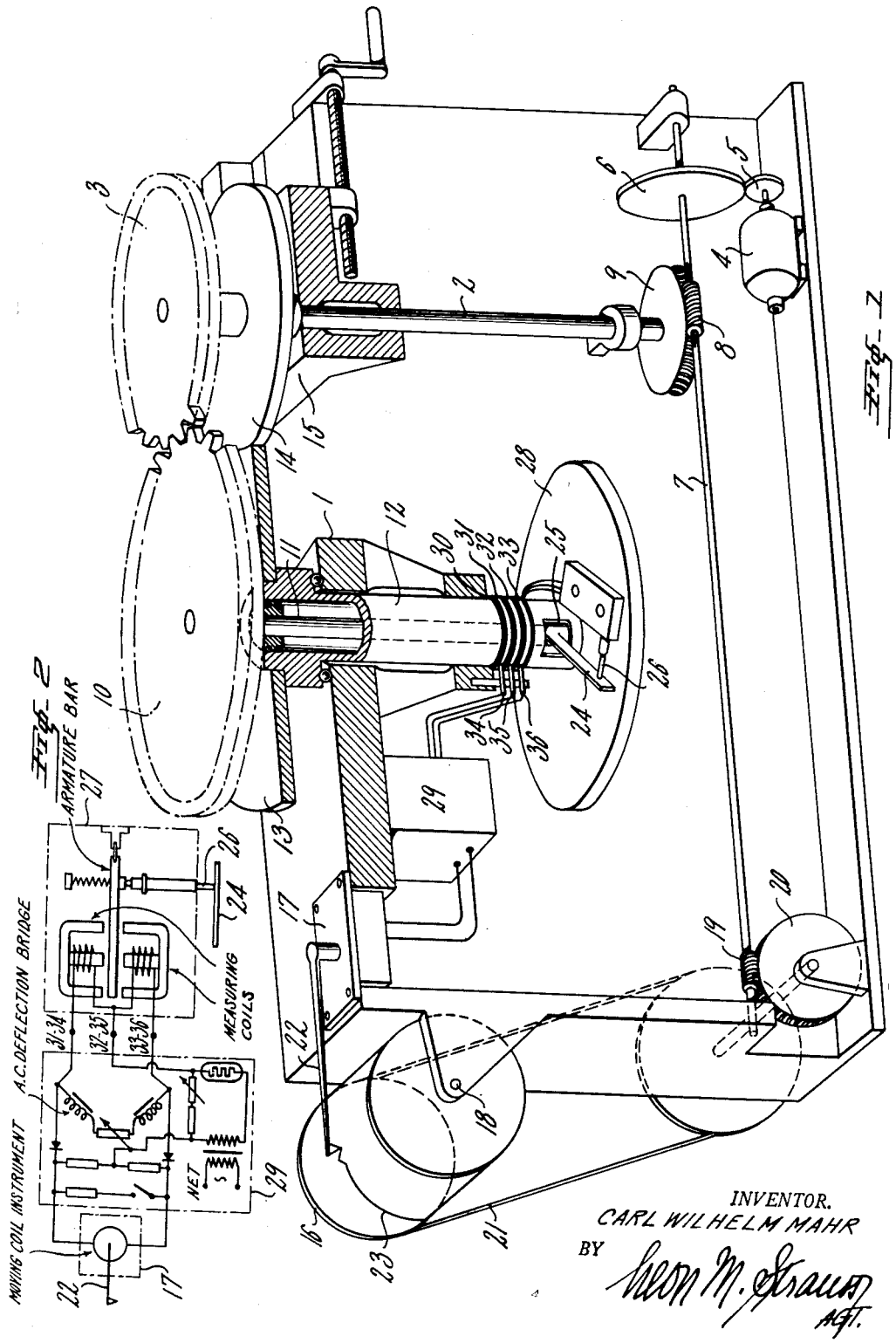
INVENTOR.
CARL WILHELM MAHR
BY Patented Aug. 31, 1954

2,687,576

UNITED STATES PATENT OFFICE 2,687,576

ELECTRICALLY OPERATED TESTING APPARATUS FOR GEARS AND SIMILAR TOOTHED ELEMENTS

Carl Wilhelm Mahr, Esslingen, Germany

Application June 17, 1950, Serial No. 168,767

Claims priority, application Switzerland June 18, 1949

8 Claims. (Cl. 33—179.5)

This invention relates to testing apparatus for gears, spur gears and similar toothed wheels or elements.

Gear-testing apparatus are known in which the piece to be tested is caused to rotate in engagement with a master gear in such manner that any defects resulting in fluctuations or deviations in angular velocity are measured as differences in angular velocity between the transmission consisting of the test piece and mating master gear in regard to a standard friction transmission of strictly uniform characteristics, these differences in angular velocity being transmitted over numerous levers and bearings to a recording device mounted on the apparatus.

It is a generally recognized disadvantage of these known types of gear testing apparatus that the combination of numerous transmission elements required for mechanical transmission of the differences in angular velocity to the recording device involves a considerable inertia for the transmission of mass movements, thus interfering with the faithful and distortion-free recording of rapid variations in angular velocity and hence with the achievement of any high precision of measuring indication.

Another disadvantage of the mechanical transmission of the differences in angular velocity is to be found in the susceptibility of the apparatus to shocks and mechanical deficiencies of all kinds. All of these and other disadvantages due to mechanical transmission of angular velocity differences are overcome by the present invention.

The invention relates to a gear-testing apparatus in which the difference in angular velocity between two coaxial shafts, of which one is solid and the other is hollow, is indicated, the one shaft bearing the piece to be tested and the other a friction disc, both of which being driven, respectively, by a mating or master gear and a mating friction disc mounted on a third shaft.

One of the main purposes of the invention is, therefore, the provision of means ensuring the transmission of the angular velocity differences as longitudinal changes or differences to an electrical tester consisting of a contact key set, a circuit connecting device and an indicator mechanism.

With the above and other objects in view, the invention will be hereinafter more fully described and the combination and arrangement of parts will be shown in the accompanying drawing and pointed out in the claims which form part of this specification.

In the drawing there is schematically disclosed one of the many possible embodiments of the invention.

The frame 1 of the testing apparatus bears on the top of a vertical shaft 2 an interchangeable master gear 3 which is driven in uniform manner, e. g. by an electric motor 4 by means of discs 5 and 6, horizontal shaft 7, worm 8 and worm gear 9. The test piece or gear 10 in mesh with master gear 3 is interchangeably mounted on a vertical shaft 11. Coaxially with the latter there is mounted a hollow shaft 12 bearing a friction disc 13 driven by an engaging friction disc 14 mounted on shaft 2.

To permit testing of gears with varying members of teeth and pitch, the friction discs 13, 14 and the master gear 3 are removably and interchangeably mounted. The diameters of friction discs 13 and 14 must correspond in each case to the pitch diameters of the test piece 10 and the master gear 3, respectively. For axial adjustment and obtainment of the proper distance between the shafts for test piece 10 and gear 3, shaft 2 is mounted in an adjustable slide 15, worm 8 being also adjustably disposed on shaft 7.

The recording device is continuously operable for visually displaying the differences of angular velocities and consists of recording drum 16 and electrical indicator mechanism 17 with stylus 22 recording the defects or errors in the test piece 10 as differences in angular velocity between shaft 11 and hollow shaft 12. The recording drum 16 is rotatably mounted on horizontal shaft 18 carried by frame 1 of the apparatus, and is driven by shaft 7 over worm 19, worm wheel 20 and belt drive 21.

The stylus 22, actuated by indicator mechanism 17, runs on the recording drum 16 and records a test marking or graph 23. While a perfect test piece 10 causes a straight or rectilinear test graph, defective test pieces will yield a test graph deviating more or less from a straight line.

In the event of manufacturing defects or errors in the test piece 10, there will be caused differences in angular velocity between shaft 11 of the test piece and hollow shaft 12. A lever 24 radially extending from and mounted on shaft 11 and projecting through a window 25 in the hollow shaft 12, is displaced in accordance with the differences in the angular velocities and transmits these differences to the spring-actuated plunger or pin 26 of the contact set 27 supported by a disc 28 on shaft 12.

The pin 26 controls and influences the DC or AC resistance of an electric circuit, or the coupling of two circuits, in a manner, that the deflection of the stylus 22 of the electrical indicator mechanism 17 is a true and highly magnified image of the motion of the plunger or pin 26.

The circuit elements other than the contact set 27 and the indicator mechanism 17 required for the electrical transmission of the motion of the pin 26 are contained in a circuit connecting box 29, together with the power supply. The electrical connection between set 27 and box 29 is effected by slip rings 31, 32, 33 attached to shaft 12 and insulated from it and each other by an insulator 30; the slip rings being in contact with respective stationary brushes 34, 35, 36.

While the mechanical parts of the testing apparatus are shown in Fig. 1, Fig. 2 illustrates in a more diagrammatical way the indicator mechanism 17 containing a moving coil, the circuit connecting box 29 containing an AC deflecting bridge, and the wiring for the network while the slip rings and brushes are correspondingly indicated at 31—34; 32—35 and 33—36.

The position of the armature bar depends upon the movement of lever 24. If the armature bar is exactly in the middle between the measuring coils, then the air gaps and the inductivity of both measuring coils have equal values. If the armature bar approaches one of the measuring coils, then the impedance of such coil increases whereas that of the other coil decreases. Since the measuring coils are connected to the AC deflecting bridge, the AC voltage at the measuring diagonal thereof forms the measure for the deviations or the movements of lever 24.

The set-up of the electrical controlling and movement translating means 17—29—27—26 may substantially correspond to conventional, inductively operated testing devices and provides an electro-responsive control means for connecting displacements of the lever 24 into corresponding electrical controls.

The deviations relatively to the neutral or median position of the armature bar are determined by the amplitude and changes of the phase voltage. If the phase voltage is rectified in accordance with the phase, then the moving coil of instrument 17 can be so adjusted that the lever deviations 24 can be directly indicated by means of stylus 22. Measuring instruments other than inductive, such as capacitive and bolometrical, may be employed.

While one embodiment of the invention has been shown and described, it will be easily understood that the same is capable of modification without departure from the general scope and spirit of the invention as defined in the claims.

Having thus described the invention, what is claimed as new and desired to be secured by Letters Patent, is:

1. In an apparatus for testing gears, a pair of concentric and coaxially arranged rotatable shafts relatively movable with respect to each other in accordance with the difference of angular velocity between a driving and a driven disk on the one hand and a test gear and master gear on the other hand, lever means extending from one of said shaft through an opening provided in the other of said concentric and coaxially arranged shafts, electric controlling means including a portion mounted on the other of said shafts, a recording device including a stylus and adapted to be influenced by the remainder of said electric controlling means dependent upon the operation of said portion of the latter, and spring actuated means positioned intermediate said lever means and said portion of said electric controlling means whereby movement of said lever means relative to the other of said coaxially arranged shafts is transmitted through said electric controlling means to said stylus.

2. An apparatus according to claim 1, wherein said electric controlling means comprise a contact key set, a circuit connecting device including a power source, and an indicator mechanism operatively connected to said stylus.

3. An apparatus according to claim 1, wherein at least one part of said electric controlling means and said spring actuated means are supported by said other of said coaxially arranged shafts.

4. An apparatus according to claim 3, including slip rings positioned and insulated on the other of said shafts, and brushes in contact with said slip rings and connected with said power supply source, said slip rings being, respectively, connected with said portion of said electric controlling means positioned on said other shaft, said brushes being respectively connected with the remainder of said electric controlling means.

5. An apparatus according to claim 4, including a frame on which said coaxially arranged shafts are supported, said brushes being held stationary on said frame and relatively to said slip rings.

6. An apparatus for testing gears comprising a frame, a pair of concentric and coaxially arranged driven shafts relatively movable with respect to each other and rotatably mounted on said frame, a drive shaft mounted on said frame for movement toward and away from said driven shafts, engaging means removably connected on said drive shaft and on one of said driven shafts for rotating the latter at a predetermined angular velocity, a test gear, a master gear, said gears being removably connected on said drive shaft and the other of said driven shafts for rotating the latter at angular velocity commensurate with any deviations of said test gear, lever means extending through an opening provided in said one driven shaft and mounted on said other driven shaft for displacement in accordance with the difference of said angular velocities, electro-responsive control means including a portion thereof mounted on said one driven shaft for converting displacements of said lever means into corresponding electrical impulses, and recording means connected to the remainder of said control means and actuatable in response to said electrical impulses for continuously recording and visually displaying the relative differences between said angular velocities.

7. An apparatus according to claim 6, wherein said recording means includes a rotatable recording drum, and a stylus engaging said drum and movable in response to said electrical controls to provide test markings deviating from a straight line.

8. An apparatus according to claim 6, wherein said portion of said control means mounted on said one driven shaft includes spaced measuring coils, and a spring-biased armature arranged between said measuring coils and movable in response to said displacements of said lever means.

References Cited in the file of this patent

UNITED STATES PATENTS

| Number | Name | Date |
|---|---|---|
| 992,926 | Updegraff | May 23, 1911 |
| 1,444,470 | Laessker | Feb. 6, 1923 |
| 2,231,702 | Burgwin et al. | Feb. 11, 1941 |
| 2,240,184 | Hathaway | Apr. 29, 1941 |
| 2,323,267 | Wittkuhns et al. | June 29, 1943 |
| 2,514,716 | Muller | July 11, 1950 |
| 2,516,748 | Boice | July 25, 1950 |
| 2,585,528 | Aeppli | Feb. 12, 1952 |

FOREIGN PATENTS

| Number | Country | Date |
|---|---|---|
| 157,090 | Great Britain | Mar. 23, 1922 |